Feb. 23, 1954
E. LUDLOW
2,670,184
AUTOMOBILE BODY HEATER
Filed April 16, 1951
3 Sheets-Sheet 1
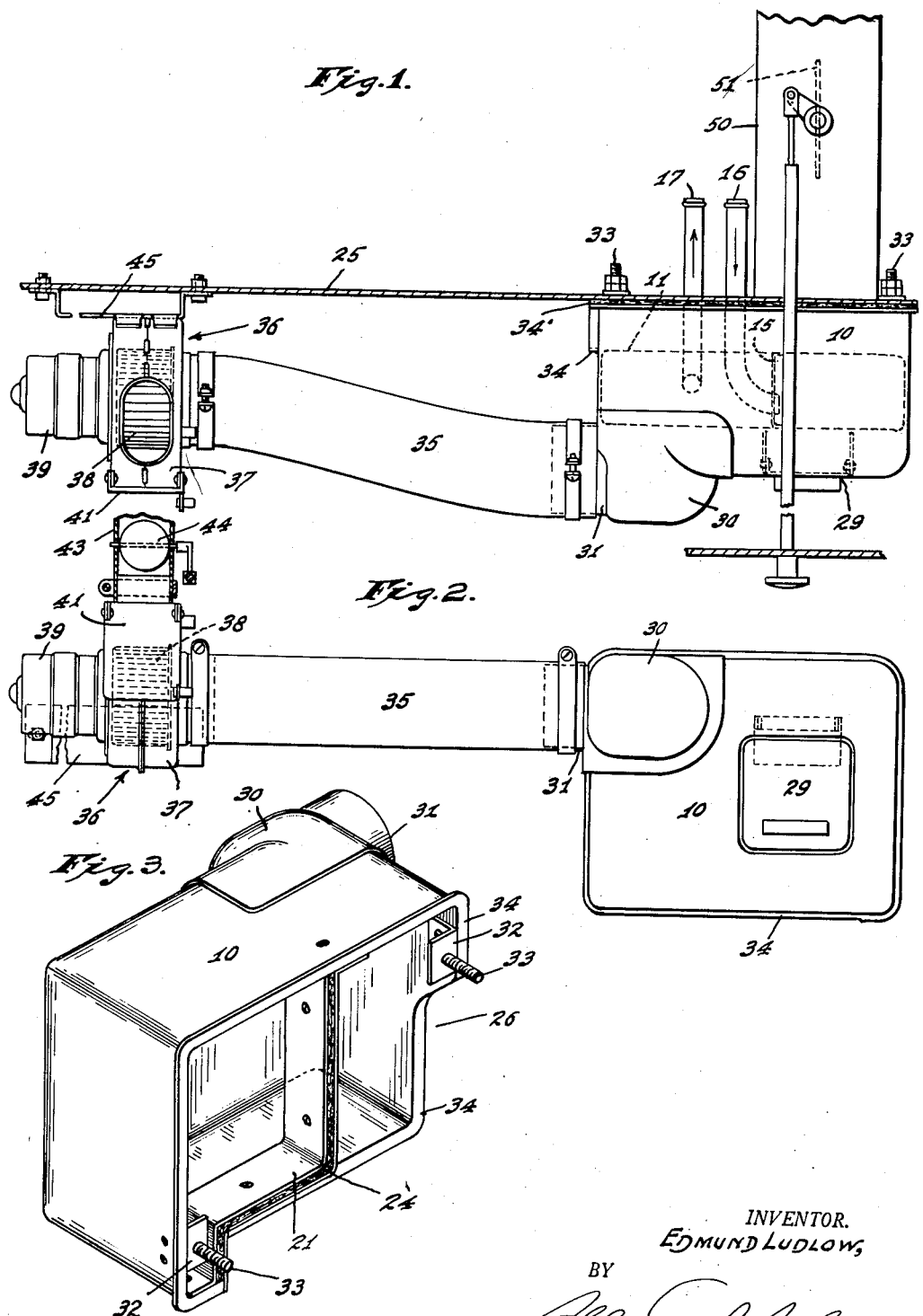
INVENTOR.
EDMUND LUDLOW,
BY
ATTORNEYS.

Feb. 23, 1954 — E. LUDLOW — 2,670,184
AUTOMOBILE BODY HEATER
Filed April 16, 1951 — 3 Sheets-Sheet 2

INVENTOR.
EDMUND LUDLOW,
BY
ATTORNEYS.

Feb. 23, 1954
E. LUDLOW
2,670,184
AUTOMOBILE BODY HEATER
Filed April 16, 1951
3 Sheets-Sheet 3
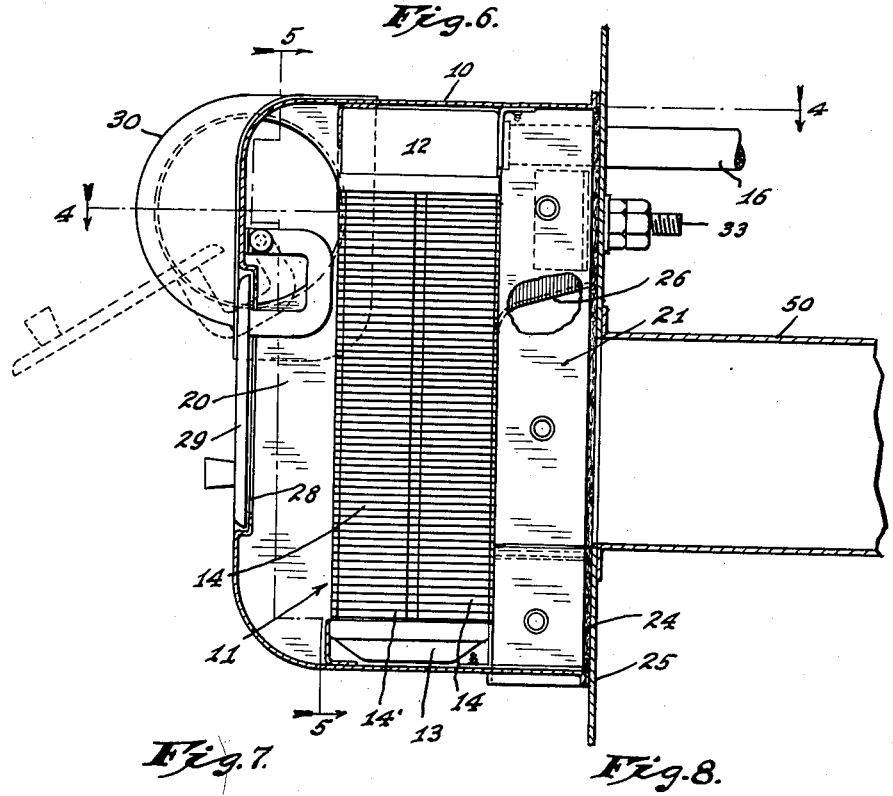
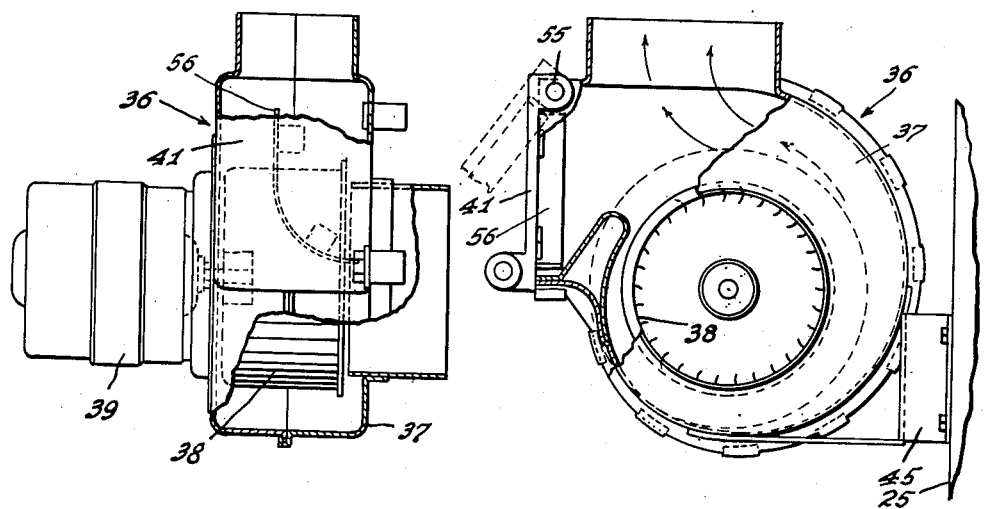
INVENTOR.
EDMUND LUDLOW,
BY
ATTORNEYS.

Patented Feb. 23, 1954

2,670,184

UNITED STATES PATENT OFFICE 2,670,184

AUTOMOBILE-BODY HEATER

Edmund Ludlow, Columbus, Ind., assignor to Arvin Industries, Inc., Columbus, Ind., a corporation of Indiana Application April 16, 1951, Serial No. 221,195

3 Claims. (Cl. 257—137)

This invention relates to automobile-body heaters of the circulating fluid type and has for an object the provision of a heater which can be simply and economically constructed and which will be exceptionally flexible in installation and mode of use. Another object of the invention is to produce an automobile-body heater which can be used alternatively with or without an associated power-driven air-circulating means. A further object of the invention is to provide a heater in which air discharged either directly into the passenger compartment of the automobile or to a defroster system can be varied in temperature without the necessity for regulating the heating fluid supply to the heater.

In carrying out the invention, I employ a housing adapted to be mounted on the dash of an automobile body, and within such housing I provide a heat-exchanging core adapted for connection into the coolant-circulating system of the automobile engine. The core is mounted intermediate the front and back of the heater to provide within the casing a front compartment and a rear compartment. (The terms "front" and "rear" are used herein with reference to the heater itself.) The rear compartment is subdivided into two chambers one of which connects freely with the passenger compartment of the automobile and the other of which is adapted for connection with the outlet end of a fresh-air supply conduit. The front compartment is provided with two openings one of which is adapted for connection to a blower or other air-moving means and the other of which connects with the passenger compartment under the control of an associated closure. A blower, if used, desirably has two outlet openings, one for defrosting air and the other connecting directly with the passenger compartment. Both blower-outlets are independently controlled so that air discharged from the blower can be supplied entirely to the defrosters, entirely to the passenger compartment, or divided between the defrosters and the passenger compartment.

Figure 4:
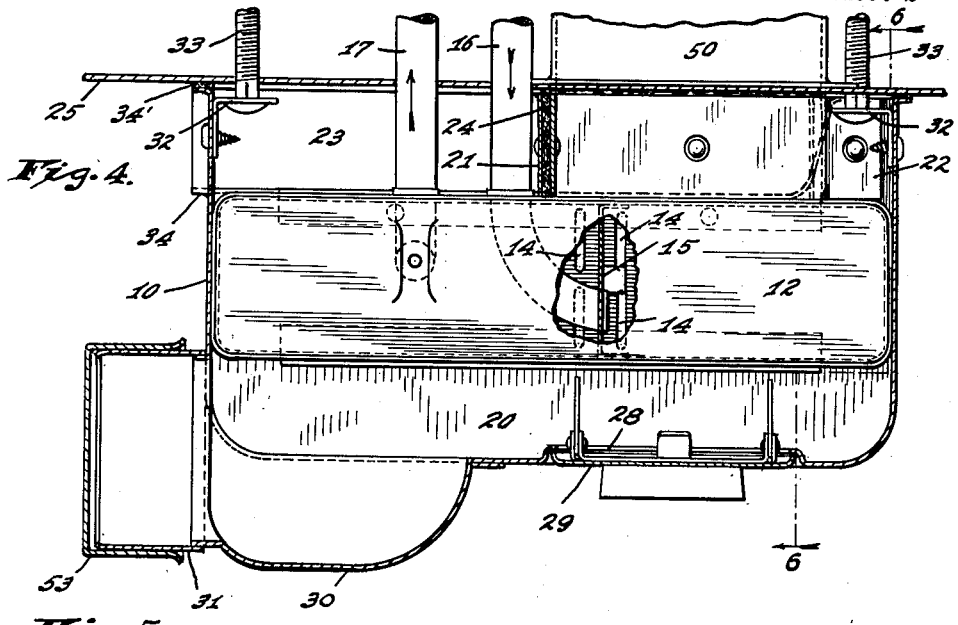
Figure 5:
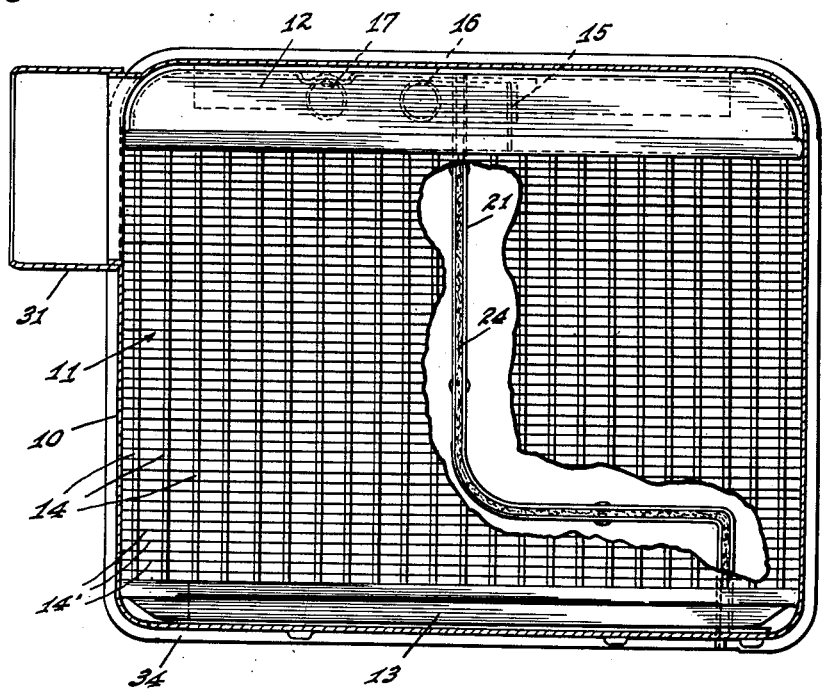

The accompanying drawings illustrate the invention. Fig. 1 is a plan view and Fig. 2 is a front elevation of a heater and associated blower mounted on the dash within the passenger compartment of an automobile; Fig. 3 is an isometric view illustrating the rear face of the heater housing; Fig. 4 is a horizontal section through the heater on the line 4—4 of Fig. 6; Fig. 5 is a vertical section through the heater on the line 5—5 of Fig. 6; Fig. 6 is a vertical section on the line 6—6 of Fig. 4; and Figs. 7 and 8 are front and side elevations of the blower unit, parts of the blower housing being broken away in each view.

The heater housing 10 shown in the drawings has a front wall, top and bottom walls, and end walls, but conveniently has no rear wall. Mounted intermediate the fore-and-aft depth of the housing 10 is a heat-exchanging core 11 (Figs. 4, 5, and 6) comprising upper and lower headers 12 and 13 interconnected through a plurality of thin-walled tubes 14 with which the customary heat-radiating fins 14' are associated. The upper header 12 is provided interiorly with a transverse partition 15 (Fig. 4) dividing it into two compartments which connect respectively with inlet and outlet nipples 16 and 17. The nipples 16 and 17 are adapted for connection into the coolant-circulating system of an automobile engine so that the coolant will flow into one compartment of the upper header downwardly through the tubes 14 communicating with that header compartment, horizontally through the lower header 13, and thence upwardly through the remaining tubes 14 into the other compartment of the upper header.

The core 11, by reason of its intermediate disposition within the housing 10, divides the housing into a front compartment 20 and a rear compartment, the latter subdivided by a partition 21 into two chambers 22 and 23. The partition 21 desirably includes yieldable material 24 which seats against the rear face of the core and the opposed face of the dash 25 upon which the heater is mounted to provide an effective seal preventing the direct flow of air between the chambers 22 and 23. The bottom wall of the housing 10 and that side wall of the housing which in part defines the chamber 23 are cut away as indicated at 26 in Fig. 3 to provide free communication between the chamber 23 and the passenger compartment of the automobile.

The front compartment 20 within the heater housing has two outlet openings, one indicated at 28 (Fig. 6) and provided with an associated closure 29 and the other covered by a stamping 30 providing a mounting for an air-outlet nipple 31 communicating with the compartment 20.

Brackets 32 secured to the housing 10 near opposite rear corners thereof are adapted to receive bolts 33 which extend through the dash 25 to hold the heater in position. At their rear edges, the side, top and bottom walls of the housing 10 are desirably turned outward to form a stiffening and reinforcing flange 34; and a gasket 34' may be interposed between such flange and the dash 25.

As arranged in Figs. 1 and 2, the nipple 31 of the housing 10 is connected through a flexible conduit 35 with the inlet of a blower designated in its entirety by the reference numeral 36. The blower 36 comprises a volute housing 37 within which there is an impeller 38 driven by a motor 39. The housing 37 has two outlet openings, one discharging directly into the passenger compartment under the control of an adjustable door 41 and the other adapted for connection to a conduit 43 extending to defroster nozzles (not shown). The conduit 43 has an associated valve 44 by means of which air flow to the defrosters nozzles can be controlled. The blower 36 is provided with a mounting bracket by means of which it can be attached to the dash 25 at an appropriate location.

The heater described is adapted for use in an automobile provided with a conduit 50 (Fig. 1) for the admission of outside air. Such air conduits customarily open forwardly so that when the automobile is driven air will flow rearwardly through the conduit under the influence of impact pressure. In mounting a heater in an automobile provided with a conduit 50, the heater is disposed so that the chamber 22 will overlie and therefore connect with the rear end of the conduit. In accordance with common practice, the conduit 50 is shown as provided with a flow-control valve or damper 51, adapted for remote control from a convenient point within the passenger compartment. To avoid interference with the customary foot pedals, the heater is ordinarily mounted at the right side of the dash with its nipple 31 directed to the left so that the blower 36 will occupy a position roughly in front of the driver.

The device as illustrated in Figs. 1 and 2 may be used in any of several different ways. If the blower 36 is operated with the valve 51 open and the closure 29 closed, as shown in Figs. 1 and 2, outside air will be drawn through the conduit 50 and that portion of the core which overlies the chamber 22 into the front compartment 20 of the heater housing 10, and from that compartment the air will be discharged through the conduit 35 to the blower 36. Dependent upon the setting of the valve 44 and door 41, the air, which has been heated by its passage through the core 11, will be discharged either to the defrosters, to the passenger compartment, or divided between the defrosters and the passenger compartment. At the same time outside air enters through the conduit 50 and passes through one portion of the core 11, air from the passenger compartment will be drawn into the chamber 23 and passed through the other portion of the core into the front compartment 20 in which it will mix with the heated outside air and be supplied to the conduit 35.

If, with the valve 51 open and the door 29 closed, the blower 36 is not operated, air will flow under impact pressure through the conduit 50, into the chamber 22, through that portion of the core 11 which in part defines the chamber 22, laterally through the compartment 20, and thence through the other portion of the core into the chamber 23 from which it will emerge directly into the passenger compartment.

It is sometimes desired in the operation of defrosters that the air blown against the windshield be not heated. To effect that result, the valve 51 may be closed to prevent the ingress of outside air and the closure 29 opened. With the heater so arranged and the blower operating, air will enter the front compartment 20 through the opening 28 and will pass directly to the blower 36 through the nipple 31 and conduit 35 without passing through the core 11.

If, with the blower not operating, it is desired that outside air admitted through the conduit 50 be heated only slightly, the valve 51 and the door 29 may be opened, thus permitting air to flow under impact pressure through the conduit 50, chamber 22, core 11, and front compartment 20 and be discharged therefrom directly into the passenger compartment through the opening 28 without making a second passage through the core into the chamber 23.

If circulation of air under impact pressure at the inlet opening of the conduit 50 is deemed sufficient for all purposes, the conduit 35 and blower 36 may be eliminated and the nipple 31 covered with the cap 53 shown in Fig. 4. With the heater so arranged, the valve 51 open, and the automobile in motion, air will flow under impact pressure into compartment 20 through the conduit 50, the chamber 22, and that portion of the core which is aligned with the chamber 22. If the closure 29 is open, the heated air will be discharged through the opening 28; but if the closure 29 is closed, air from the compartment 20 will make a second traverse of the core into the chamber 23 and will emerge directly into the passenger compartment through the opening 26.

In hot weather, flow of coolant through the core may be shut off, thus providing for the admission of unheated air into the passenger compartment through the conduit 50 and heater housing 10.

As previously noted, it is contemplated that the blower 36 will be mounted in front of the driver of the automobile and, when the door 41 is open, will discharge directly toward the driver. In many cases, it is desired that a portion of the air discharged into the passenger compartment from the blower 36 be directed laterally toward the front-seat passenger. To accomplish that result, the door 41 is pivoted at 55 for swinging movement about a horizontal axis into and out of its vertical closed position shown in Fig. 8. To the inner face of the door there is secured a baffle 56 so shaped that a portion of the air discharged from the blower 36 when the door 41 is open will be diverted rightwardly toward a front-seat passenger.

I claim as my invention:

1. An automobile-body heater of the circulating fluid type, comprising a housing having front, top, bottom, and side walls, said housing being open at its rear and adapted to be mounted in the passenger compartment of an automobile with its open rear against the automobile dash and overlying an air-admitting opening through the dash, a heat-exchanging core dividing the interior of the housing into front and rear compartments and provided with air-passages, a partition mounted in the housing to extend between the core and dash and divide the rear compartment into first and second chambers both of which communicate with the front compartment through the air passages of the core, said partition being so arranged that only said first chamber will communicate with said air-admitting opening, said housing having first and second openings providing for communication of the passenger compartment respectively with the front housing compartment and with the second chamber, and an adjustable closure for said first opening.

2. An automobile-body heater of the circulating fluid type, comprising a housing adapted to be mounted in the passenger compartment of an automobile, a heat-exchanging core dividing the interior of said housing into first and second compartments and provided with air passages, a partition subdividing the first compartment into a first chamber adapted to receive air to be heated and a second chamber, said two chambers communicating with said second compartment through said air-passages, said housing having first and second openings providing for communication of the passenger compartment respectively with the second housing compartment and with the second chamber, an adjustable closure for said first opening, a blower having an inlet opening communicating with said second housing compartment and an outlet opening for communication with the passenger compartment, a pivotally mounted door for controlling said outlet opening, and an air-deflecting baffle on said door.

3. In an automobile-body heater, a blower having an outlet opening through which the blower discharges air into the passenger compartment of an automobile, means for heating air supplied to the blower, a door pivotally mounted on a horizontal axis above said opening and adjustable about its axis to control air-discharge from the opening, and an air-deflecting baffle mounted on said door for deflecting air laterally of the passenger compartment when the door is open.

EDMUND LUDLOW.

References Cited in the file of this patent

UNITED STATES PATENTS

| Number | Name | Date |
|---|---|---|
| 2,214,165 | Fink | Sept. 10, 1940 |
| 2,270,823 | Meyerhoefer | Jan. 20, 1942 |
| 2,322,041 | Mayo | June 15, 1943 |
| 2,325,427 | Reynolds | July 27, 1943 |

FOREIGN PATENTS

| Number | Country | Date |
|---|---|---|
| 521,507 | Great Britain | May 23, 1940 |